Patented Sept. 5, 1944

2,357,479

UNITED STATES PATENT OFFICE 2,357,479

HYDROGENATION OF ALKOXY-SUBSTITUTED ESTERS AND PRODUCTS

Donald John Loder and William Franklin Gresham, Wilmington, Del., and Donald Bernard Killian, Newark, N. J., assignors to E. I. du Pont de Nemours & Company, Wilmington, Del., a corporation of Delaware No Drawing. Original application February 24, 1939, Serial No. 258,180. Divided and this application July 11, 1942, Serial No. 450,618

3 Claims. (Cl. 260—615)

This invention relates to a process for the hydrogenation of alkoxy-substituted aliphatic organic acids and their esters, and more particularly, to the conversion of the carboxyl or ester group of such compounds to an alcohol group. This application is a division of our copending application S. N. 258,180, filed February 24, 1939.

The materials treated in accord with the hydrogenation process of the invention have the generic formula:

(1) 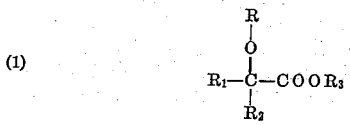

wherein R is an alkyl, aryl, aralkyl, alkoxy methylene or alkoxy alkylidene group; $R_1$ is hydrogen or an alkyl, aryl, or aralkyl group; $R_2$ is a hydrogen or alkyl, aryl, aralkyl, alkoxy or hydroxy methylene or alkylidene group; and $R_3$ is hydrogen or an alkyl group. Such compounds will hereinafter be generically referred to as oxy-substituted carboxylic compounds. The products obtained by hydrogenation in accord with my process have the generic formula:

(2) 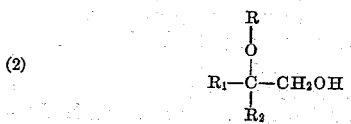

the groups in the R, $R_1$, $R_2$ and $R_3$ positions being the same as those given for the material treated.

The invention relates to the hydrogenation of materials such as (a) alpha methyl ether of methyl glycerate,

(b) alpha (methoxy methyl) ether of methyl glycerate,

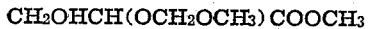

(c) methyl (methoxy methoxy) acetate,

(d) methyl methoxy acetate,

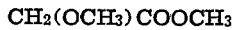

(e) isobutyl isobutoxy acetate,

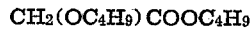

and (f) 2-carboxymethyl-1,3-dioxolane,

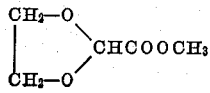

to produce, respectively, ($a_1$) glycerol beta methyl ether,

($b_1$) glycerol beta (methoxy methyl) ether,

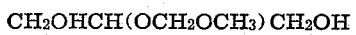

($c_1$) (methoxy methoxy) ethanol,

($d_1$) ethylene glycol monomethyl ether,

($e_1$) ethylene glycol monoisobutyl ether,

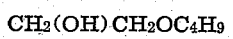

and ($f_1$) 2-oxymethyl-1,3-dioxolane,

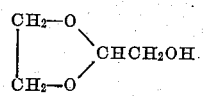

An object of the invention is to provide a process for the preparation of the above described compounds and their homologues. The invention further provides a process for the hydrogenation of the ester or carboxyl group of an alkoxy, aryloxy or substituted alkoxy or aryloxy compound to an alcohol group. Another object of the invention is to provide a process for the conversion of alkoxy carboxylic acids, their esters and derivatives to the corresponding glycol ethers. A further object of the invention is to provide new glycol and glycerol ethers. Other objects and advantages of the invention will hereinafter appear.

In general, the invention is carried out by bringing the alkoxy carboxylic compound and hydrogen into intimate contact with a suitable hydrogenating catalyst under relatively high temperature and pressure, the reactants being in the liquid or vapor phase or both. There are, however, several modifications of the general process. For example, a mixture of the compound to be hydrogenated, solid catalyst and gaseous hydrogen may be brought together with high temperatures and pressures in a closed autoclave capable of withstanding the necessary pressure. When operating under such conditions, the catalyst is preferably a composition containing copper, either in its elemental form or combined with oxygen as a lower oxide. Other hydrogenating metal oxides may be employed in conjunction with copper, suitable catalyst supports such as kieselguhr, silica gel, and activated carbon may be present. In a further modification of the process, the alkoxy carboxylic compounds and hydrogen are passed under high pressures and elevated temperatures over mixed hydrogenation catalysts containing substantial quantities of difficultly reducible oxides of hydrogenating metals prepared in suitable granular form and held in a pressure-resisting tube. Catalysts similar to those disclosed in the copending application of A. T. Larson, S. N. 171,894, filed October 30, 1938, which describes cooper catalysts, promoted or unpromoted with one or more metal oxides, may be employed.

The reaction proceeds in accord with the following equation:

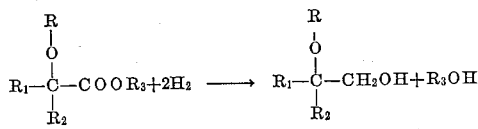

It will be appreciated that, by substituting in the R, $R_1$, $R_2$ and $R_3$ positions, as has already been described, a number of materials can be hydrogenated in accord with the invention to produce glycol ethers or glycerol ethers. It may be generally stated that the reaction involves the interaction of an alkoxy substituted acid or its ester or a substituted alkoxy acid or its ester to produce a corresponding ether of a polyhydric alcohol.

The process of the present invention may be effected at temperatures ranging between 150 and 350° C. and preferably between a temperature of approximately 175 and 250° C. The pressure may be maintained between approximately 30 and 1000 atmospheres, with preferred pressures between 400 and 700 atmospheres.

The more detailed practice of the invention is illustrated by the following examples, in which parts are by weight unless otherwise stated. There are, of course, many forms of the invention other than these specific embodiments.

*Example 1.*—A high pressure autoclave was charged with 75 parts of alpha methyl ether of methyl glycerate and 25 parts of methanol in the presence of a copper chromite hydrogenation catalyst (prepared by co-precipitating copper oxide and chromium oxide on kieselguhr and reduction of the dried catalyst with hydrogen). The temperature of the vessel and contents were raised to between 200 and 225° C. and hydrogen introduced to give a pressure of approximately 600 atmospheres. The reaction was continued until the absorption of hydrogen substantially ceased, whereupon the hydrogen pressure was released, the hydrogenation product fractionated to remove the methanol, and glycerol beta-methyl ether (B. P. 118–120° C., 10 mm. pressure, specific gravity at 16° C. 1.13) was recovered in practically quantitative yields.

*Example 2.*—The process of Example 1 was repeated using 50 parts of alpha (methoxy methyl) ether of methyl glycerate, 50 parts of methanol and 10 parts of the copper chromite catalyst of Example 1. The temperature of the reaction was held between 200 and 250° C. and the pressure of hydrogen maintained at approximately 600 atmospheres. The product was recovered as in Example 1 and after the distillation of the methanol practically pure glycerol beta (methoxy methyl) ether (B. P. 124–127° C. at 6 mm. pressure) was obtained.

*Example 3.*—The process of Example 1 was conducted utilizing 69.8 parts of methyl (methoxy methoxy) acetate, and 106 parts of methanol, in the presence of 20 parts of the copper chromite catalyst. At a temperature of approximately 200° C. and a pressure of 600 atmospheres (methoxy methoxy) ethanol (B. P. 150–153° C. at 760 mm., specific gravity at 16° C., 1.04) in approximately a 60% yield was obtained.

*Example 4.*—The process of Example 1 was repeated using 50 parts of isobutyl isobutoxy acetate, 50 parts of isobutanol and 10 parts of the copper chromite catalyst. A good yield of the isobutyl ether of ethylene glycol was obtained.

These products are useful as solvents for cellulose derivatives and as intermediates for the preparation of oxygenated organic compounds.

From a consideration of the above specification it will be realized that many changes may be made in the details therein given without departing from the invention or sacrificing any of the advantages that may be derived therefrom.

We claim:

1. A process for the preparation of glycerol β-(methoxy methyl) ether which comprises hydrogenating an alpha (methoxy methyl) ether of methyl glycerate to a glycerol β-(methoxy methyl) ether in contact with a hydrogenation catalyst, at a temperature between 150 and 350° C., and at a pressure between 25 and 1000 atmospheres.

2. A process for the preparation of glycerol β-(methoxy methyl) ether which comprises hydrogenating a mixture containing approximately 50 parts of alpha (methoxy methyl) ether of methyl glycerate, 50 parts of methanol, and 10 parts of a copper chromite catalyst at a temperature between 200 and 250° C. and under a hydrogen pressure of approximately 600 atmospheres.

3. Glycerol β-(methoxy methyl) ether.

DONALD JOHN LODER
WILLIAM FRANKLIN GRESHAM.
DONALD BERNARD KILLIAN.